United States Patent
Nishida

(10) Patent No.: US 11,797,741 B2
(45) Date of Patent: Oct. 24, 2023

(54) COMPUTER-READABLE RECORDING MEDIUM STORING TIMING LIBRARY CREATION PROGRAM, METHOD OF CREATING TIMING LIBRARY, AND TIMING ANALYSIS APPARATUS

(71) Applicant: FUJITSU LIMITED, Kawasaki (JP)

(72) Inventor: Keisuke Nishida, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/700,576

(22) Filed: Mar. 22, 2022

(65) Prior Publication Data

US 2022/0405452 A1    Dec. 22, 2022

(30) Foreign Application Priority Data

Jun. 17, 2021   (JP) .................................. 2021-100597

(51) Int. Cl.
   *G06F 30/3315*   (2020.01)
   *G06F 111/10*    (2020.01)
   *G06F 119/12*    (2020.01)

(52) U.S. Cl.
   CPC ...... *G06F 30/3315* (2020.01); *G06F 2111/10* (2020.01); *G06F 2119/12* (2020.01)

(58) Field of Classification Search
   CPC ............. G06F 30/3315; G06F 2111/10; G06F 2119/12; G06F 2111/08; G06F 2115/08; G06F 2111/20; G06F 2119/18
   See application file for complete search history.

(56) References Cited

U.S. PATENT DOCUMENTS

| | | | | |
|---|---|---|---|---|
| 7,222,319 | B2 * | 5/2007 | Yonezawa | G06F 30/3312 716/108 |
| 7,669,154 | B2 * | 2/2010 | Hosono | G06F 30/3312 716/135 |
| 8,117,575 | B2 * | 2/2012 | Lu | G06F 30/3312 716/108 |
| 9,928,327 | B2 * | 3/2018 | Acar | G06F 30/3323 |
| 10,162,916 | B1 * | 12/2018 | Narasimha | G06F 30/34 |
| 2005/0050499 | A1 * | 3/2005 | Matsumoto | G06F 30/3312 716/113 |

(Continued)

FOREIGN PATENT DOCUMENTS

| | | |
|---|---|---|
| JP | 2005-352787 A | 12/2005 |
| JP | 2008-112383 A | 5/2008 |
| JP | 2009-252140 A | 10/2009 |

*Primary Examiner* — Nha T Nguyen
(74) *Attorney, Agent, or Firm* — Fujitsu Patent Center

(57) ABSTRACT

A non-transitory computer-readable recording medium storing a timing library creation program of causing a computer to execute processing, the processing including: extracting, from a delay variation database that stores delay variation values of gates included in circuit design data, a delay variation value, out of the delay valuation values matching to characteristics which are characteristics of one of signal paths in the circuit design data and which include a threshold voltage, a drive force, and a number of gate stages of the signal path; calculating an extended delay variation coefficient based on the extracted delay variation value and the characteristics; and creating, based on a basic timing library in which the delay variation value is not reflected and the extended delay variation coefficient, an extended timing library in which the delay variation value is reflected.

3 Claims, 11 Drawing Sheets

(56) References Cited

U.S. PATENT DOCUMENTS

| | | |
|---|---|---|
| 2005/0276135 A1 | 12/2005 | Yonezawa |
| 2008/0104562 A1 | 5/2008 | Ichinose |
| 2008/0320427 A1* | 12/2008 | Nakashima ............ G06F 30/367 |
| | | 716/113 |
| 2009/0288052 A1* | 11/2009 | Sunohara ............ G06F 30/3312 |
| | | 716/113 |
| 2010/0242007 A1* | 9/2010 | Yoda ................... G06F 30/3323 |
| | | 716/108 |
| 2017/0262569 A1* | 9/2017 | Huynh ................ G06F 30/3312 |

* cited by examiner

FIG. 6

| Vth | DRIVE FORCE | BASIC DELAY | DELAY VARIATION VALUE | DELAY VARIATION COEFFICIENT |
|---|---|---|---|---|
| Vth A | x1 | 10 | 1 | 10.0% |
| Vth A | x2 | 8 | 0.5 | 6.3% |
| Vth A | x3 | 6 | 0.25 | 4.2% |

...

| Vth B | x1 | 20 | 3 | 15.0% |
|---|---|---|---|---|
| Vth B | x2 | 16 | 1.5 | 9.4% |
| Vth B | x3 | 12 | 0.75 | 6.3% |

| INPUT PIN NAME | OUTPUT PIN NAME | SIDE PIN CONDITION | Vth | DRIVE FORCE | NUMBER OF STAGES |
|---|---|---|---|---|---|
| A0 | X0 | cntl=00 | Vth A | x3 | 30 |
| A1 | X1 | cntl=01 | Vth A<br>Vth B | x3<br>x3 | 5<br>10 |

...

| A(n-1) | X(m-1) | cntl=10 | Vth B | x3 | 5 |
| An | Xm | cntl=11 | Vth B | x1 | 5 |

FIG. 8

| INPUT PIN NAME | OUTPUT PIN NAME | SIDE PIN CONDITION | EXTENDED DELAY VARIATION COEFFICIENT |
|---|---|---|---|
| A0 | X0 | cntl=00 | 1.008 |
| A1 | X1 | cntl=01 | 1.016 |

...

| A(n-1) | X(m-1) | cntl=10 | 1.028 |
| An | Xm | cntl=11 | 1.067 |

FIG. 9

```
cell (LARGE_IP) {
  area : 1.000;
  ...
  pin (X0) {
    direction : "output";
    max_capacitance : 1.000;
    max_transition   : 1.000;
    timing ( ) {
      related_pin : "A0";
      timing_type : "combinational";
      timing_sence : "positive_unate";
      cell_rise ("delay_template_2x2") {
        index_1 ("1000, 1001");
        index_2 ("2000, 2001");
        values ("0.500, 1.000", ¥
                "1.000, 1.500");
      }
      ...
    }
  }
  pin (Xm) {
    direction : "output";
    max_capacitance : 1.000;
    max_transition   : 1.000;
    timing ( ) {
      related_pin : "An";
      timing_type : "combinational";
      timing_sence : "positive_unate";
      cell_rise ("delay_template_2x2") {
        index_1 ("1000, 1001");
        index_2 ("2000, 2001");
        values ("1.000, 2.000", ¥
                "2.000, 3.000");
      }
      ...
    }
  }
}
```

BASIC TIMING LIBRARY

⎯x1.25⟶ (applied to first values block)

⎯x1.50⟶ (applied to second values block)

```
cell (LARGE_IP) {
  area : 1.000;
  ...
  pin (X0) {
    direction : "output";
    max_capacitance : 1.000;
    max_transition   : 1.000;
    timing ( ) {
      related_pin : "A0";
      timing_type : "combinational";
      timing_sence : "positive_unate";
      cell_rise ("delay_template_2x2") {
        index_1 ("1000, 1001");
        index_2 ("2000, 2001");
        values ("0.625, 1.250", ¥
                "1.250, 1.875");
      }
      ...
    }
  }
  pin (Xm) {
    direction : "output";
    max_capacitance : 1.000;
    max_transition   : 1.000;
    timing ( ) {
      related_pin : "An";
      timing_type : "combinational";
      timing_sence : "positive_unate";
      cell_rise ("delay_template_2x2") {
        index_1 ("1000, 1001");
        index_2 ("2000, 2001");
        values ("1.500, 3.000", ¥
                "3.000, 4.500");
      }
      ...
    }
  }
}
```

EXTENDED TIMING LIBRARY

COMPUTER-READABLE RECORDING MEDIUM STORING TIMING LIBRARY CREATION PROGRAM, METHOD OF CREATING TIMING LIBRARY, AND TIMING ANALYSIS APPARATUS

CROSS-REFERENCE TO RELATED APPLICATION

This application is based upon and claims the benefit of priority of the prior Japanese Patent Application No. 2021-100597, filed on Jun. 17, 2021, the entire contents of which are incorporated herein by reference.

FIELD

The embodiment discussed herein is related to a computer-readable recording medium storing a timing library creation program, a method of creating a timing library, and a timing analysis apparatus.

BACKGROUND

Development of large-scale integration (LSI) has been performed by using an intellectual property (IP), which is circuit design data. To promote product design, medical technology development, weather change prediction, various basic studies, and so forth, further improvement in performance of the LSI is demanded. One of techniques for improving the performance of the LSI is incorporation of a large-scale IP having a plurality of signal paths. The large-scale IP is a single huge cell in which a huge logic is optimized with respect to both the logic design and the physical implementation and packaged as a hard macro.

In an ordinary standard cell, basically, threshold voltages Vth of all the signal paths are the same, drive forces of all the signal paths are the same, and the numbers of gate stages of all the signal paths are the same. In contrast, in the large-scale IP, the Vths of the signal paths, the drive forces of the signal paths, and the numbers of gate stages of the signal paths vary from one signal path to another because signal paths of high-speed operation and signal paths of low-speed operation are mixed in a single cell. Since there are many complex logics in the large-scale IP, the number of gate stages of a signal path tends to increases.

To verify timing of the LSI, a static timing analysis (hereafter, may be referred to as an "STA") is ordinarily used. In the STA, the timing verification is performed by reading timing information of a cell included in the LSI from a timing library.

Examples of the related art include as follows: Japanese Laid-open Patent Publication No. 2005-352787; Japanese Laid-open Patent Publication No. 2008-112383; and Japanese Laid-open Patent Publication No. 2009-252140.

SUMMARY

According to an aspect of the embodiments, there is provided a non-transitory computer-readable recording medium storing a timing library creation program of causing a computer to execute processing. In an example, the processing includes: extracting, from a delay variation database that stores delay variation values of gates included in circuit design data, a delay variation value, out of the delay valuation values matching to characteristics which are characteristics of one of signal paths in the circuit design data and which include a threshold voltage, a drive force, and a number of gate stages of the signal path; calculating an extended delay variation coefficient based on the extracted delay variation value and the characteristics; and creating, based on a basic timing library in which the delay variation value is not reflected and the extended delay variation coefficient, an extended timing library in which the delay variation value is reflected.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an example of a delay variation DB;

FIG. 7 illustrates an example of a path-specific information list;

FIG. 8 illustrates an example of an extended delay variation coefficient database (DB);

FIG. 9 illustrates an example of an extended timing library for a basic timing library;

DESCRIPTION OF EMBODIMENTS

Figure 1:
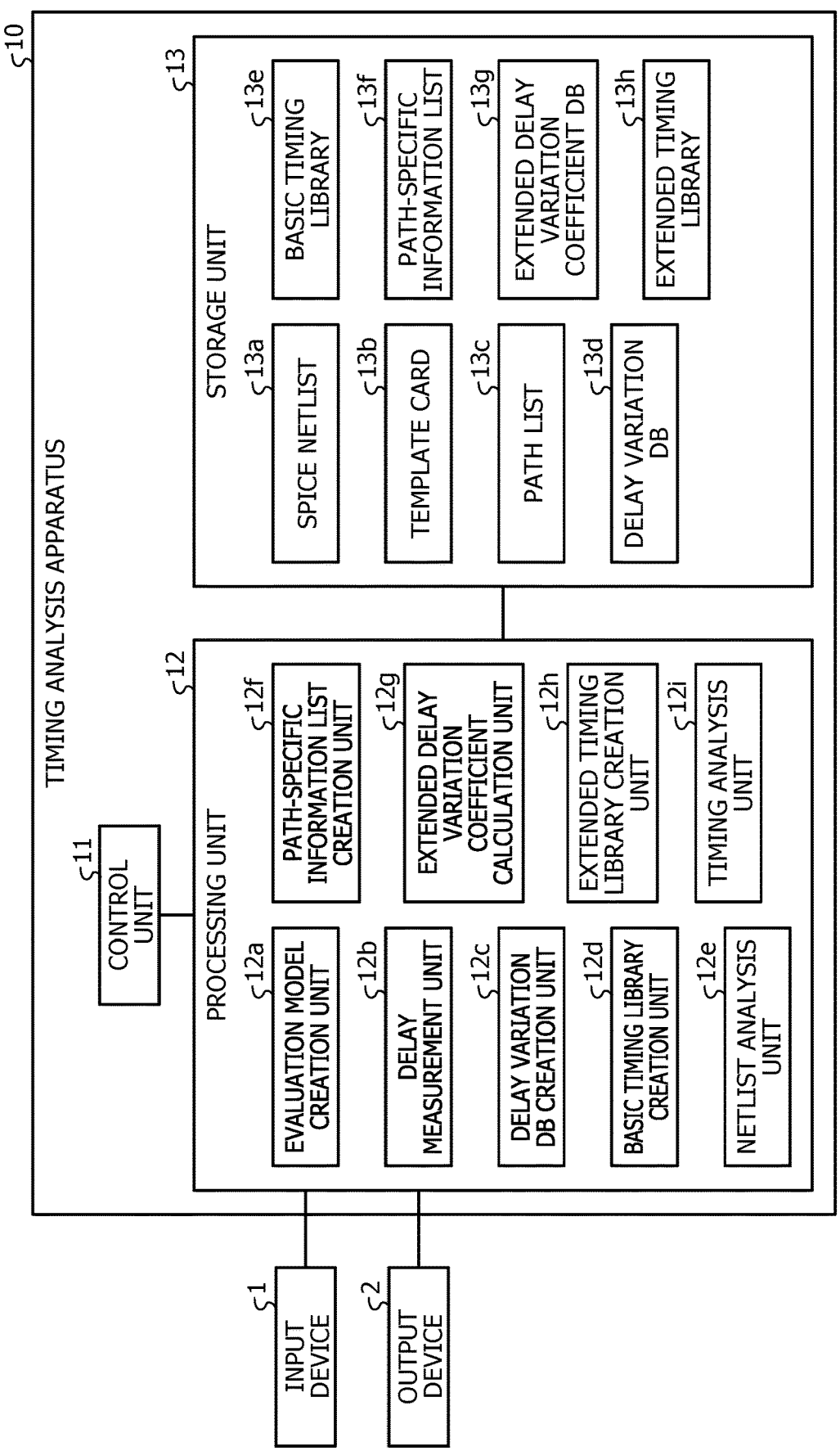
FIG. 1 is a block diagram illustrating an example of a configuration of a timing analysis apparatus.

Since manufacturing variation (process variation) existing in transistors changes cell characteristic values and causes a timing change of the cell, a result of timing verification by using the STA is not necessarily coincident with a result of timing verification of an actual LSI. Meanwhile, due to, for example, intra-chip variation or the like, it is difficult to exactly estimate the timing change due to the manufacturing variation of transistors in advance at the design stage of the LSI.

Two types of manufacturing variation components, a systematic component and a random component, are included in the intra-chip variation. The systematic component is a deterministic variation component and generated by a proximity effect or double patterning, whereas the random component is a randomly generated variation component and is caused by a fluctuation in threshold voltage due to a fluctuation in impurity concentration. Ordinarily, a Monte Carlo simulation for which a large number of man-hours are demanded is used to calculate the random component. However, since a significantly large number of man-hours are demanded for the Monte Carlo simulation in the large-scale IP, it is not realistic to use the Monte Carlo simulation for the large-scale IP.

Accordingly, it is conceivable to cover the timing change by using a timing margin uniformly set on a cell-by-cell basis or for all cells/all IPs (hereafter, may be referred to as a "uniform timing margin"). For example, it is conceivable to perform the STA by reflecting the uniform timing margin in basic timing information read from a timing library having only the basic timing information that is not influenced by the variation.

However, since the uniform timing margin is demanded to cover all situations, it is likely that the uniform timing margin is an excessive value. For example, in recent years, manufacturing variation due to an increase in fineness of transistors continues to increase. Thus, the uniform timing margin is likely to be an excessive value.

For example, ordinarily, variation of the signal paths of high-speed operation is small and variation of the signal paths of a low-speed operation is large. Accordingly, when the uniform timing margin is applied to the large-scale IP, a timing margin is calculated from a signal path of low-speed operation having a large variation, and the calculated timing margin is set in an STA tool as the uniform timing margin. Thus, the excessive timing margin calculated from the signal path of low-speed operation is also applied to the signal path of high-speed operation. In the large-scale IP, the Vth, the drive force, and the number of gate stages vary from one signal path to another. Accordingly, when the uniform timing margin is applied to the large-scale IP, it is difficult to obtain the target frequency even in the case where the large-scale IP is used.

Accordingly, the present disclosure proposes a technique with which an optimal timing library for an IP may be created.

Embodiment

A signal propagation time calculation program, a method of calculating signal propagation time, and a timing analysis apparatus according to an embodiment will be described below with reference to the accompanying drawings. Description of the same configuration or processes that are redundant will be omitted from the following description of the embodiment. The following embodiment is not intended to limit the disclosed technique. The embodiment and modification examples may be appropriately combined as long as the combination does not make contradiction in contents of processing.

<Configuration of Timing Analysis Apparatus>

FIG. 1 is a block diagram illustrating an example of a configuration of a timing analysis apparatus. As an example, an information processing apparatus such as any of various types of computers may be adopted as a timing analysis apparatus 10. The timing analysis apparatus 10 is coupled to an input device 1 and an output device 2. Examples of the input device 1 include, for example, a character input device such as a keyboard and a touch panel, a pointing device such as a mouse, an image obtaining device such as a scanner, and a storage medium reading device. Examples of the output device 2 include, for example, a display and a printer. An input device 1 accepts various types of information including design information of a large-scale integration (LSI) or various types of instructions related to timing verification of the LSI and inputs the information or instructions to the timing analysis apparatus 10. The output device 2 outputs a result of verification related to the timing verification of the LSI by using the timing analysis apparatus 10.

The timing analysis apparatus 10 includes a control unit 11, a processing unit 12, and a storage unit 13. The control unit 11 controls the processing unit 12. The processing unit 12 includes an evaluation model creation unit 12a, a delay measurement unit 12b, a delay variation database (DB) creation unit 12c, a basic timing library creation unit 12d, a netlist analysis unit 12e, a path-specific information list creation unit 12f, an extended delay variation coefficient calculation unit 12g, an extended timing library creation unit 12h, and a timing analysis unit 12i. The storage unit 13 stores a simulation program with integrated circuit emphasis (SPICE) netlist 13a, a template card 13b, a path list 13c, a delay variation DB 13d, a basic timing library 13e, a path-specific information list 13f, an extended delay variation coefficient DB 13g, and an extended timing library 13h.

The control unit 11 and the processing unit 12 are realized as hardware by using, for example, a processor. Examples of the processor include a central processing unit (CPU), a microprocessor unit (MPU), an application-specific integrated circuit (ASIC), a field-programmable gate array (FPGA), and the like. The storage unit 13 is realized as hardware by using, for example, a memory or an auxiliary storage device. Examples of the memory include a random-access memory (RAM), a read-only memory (ROM), a flash memory, and the like. Examples of the auxiliary storage device include a hard disk drive (HDD), an optical disc, a magneto-optical disc, a solid-state drive (SSD), and the like.

<Processing Procedure in Timing Analysis Apparatus>

Figure 2:
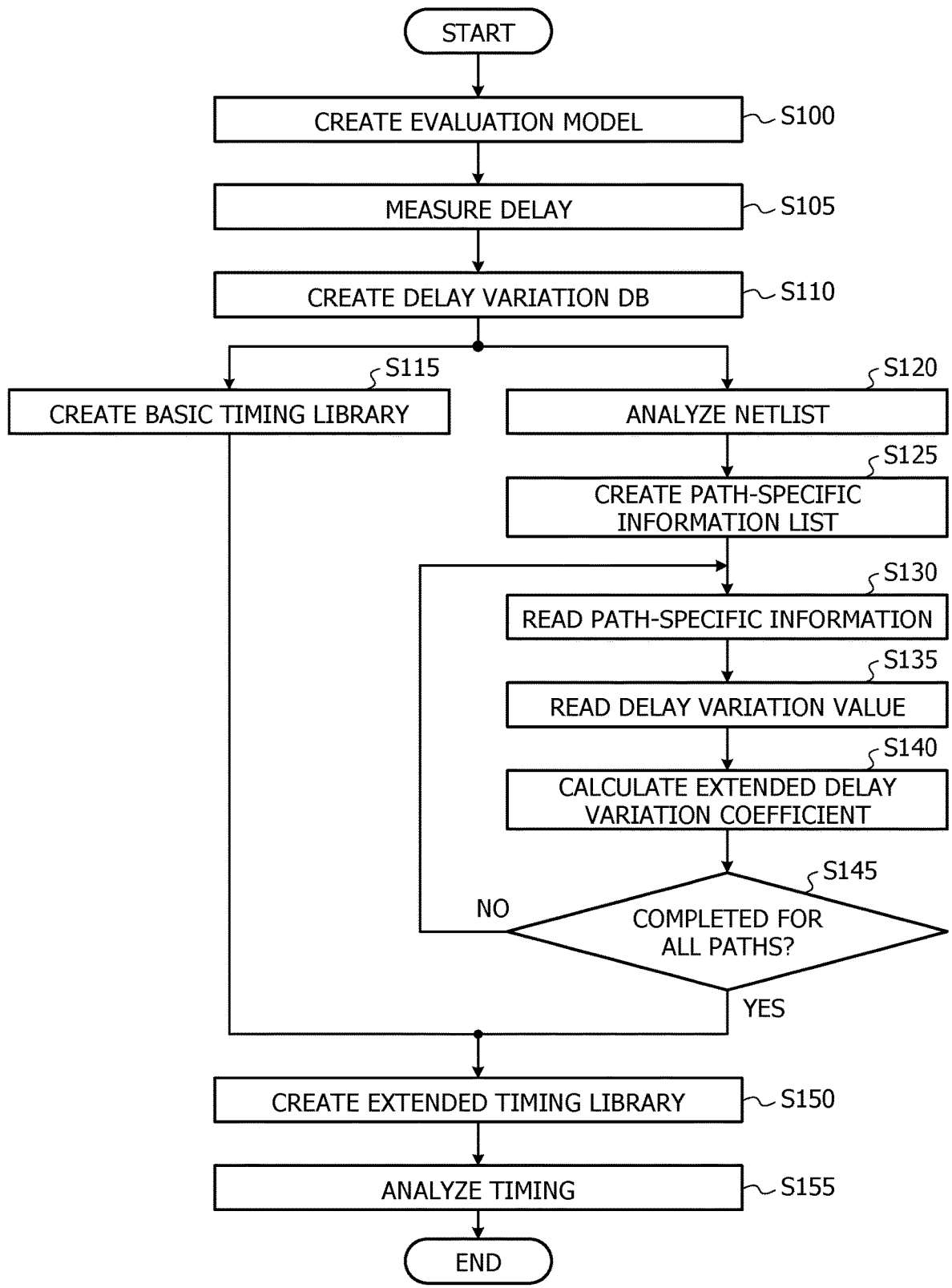
FIG. 2 is a flowchart illustrating an example of a processing procedure in the timing analysis apparatus.

FIG. 2 is a flowchart illustrating an example of a processing procedure in the timing analysis apparatus. The evaluation model creation unit 12a, the delay measurement unit 12b, the delay variation DB creation unit 12c, the basic timing library creation unit 12d, the netlist analysis unit 12e, the path-specific information list creation unit 12f, the extended delay variation coefficient calculation unit 12g, the extended timing library creation unit 12h, and the timing analysis unit 12i perform processes under the control of the control unit 11.

Figure 3:
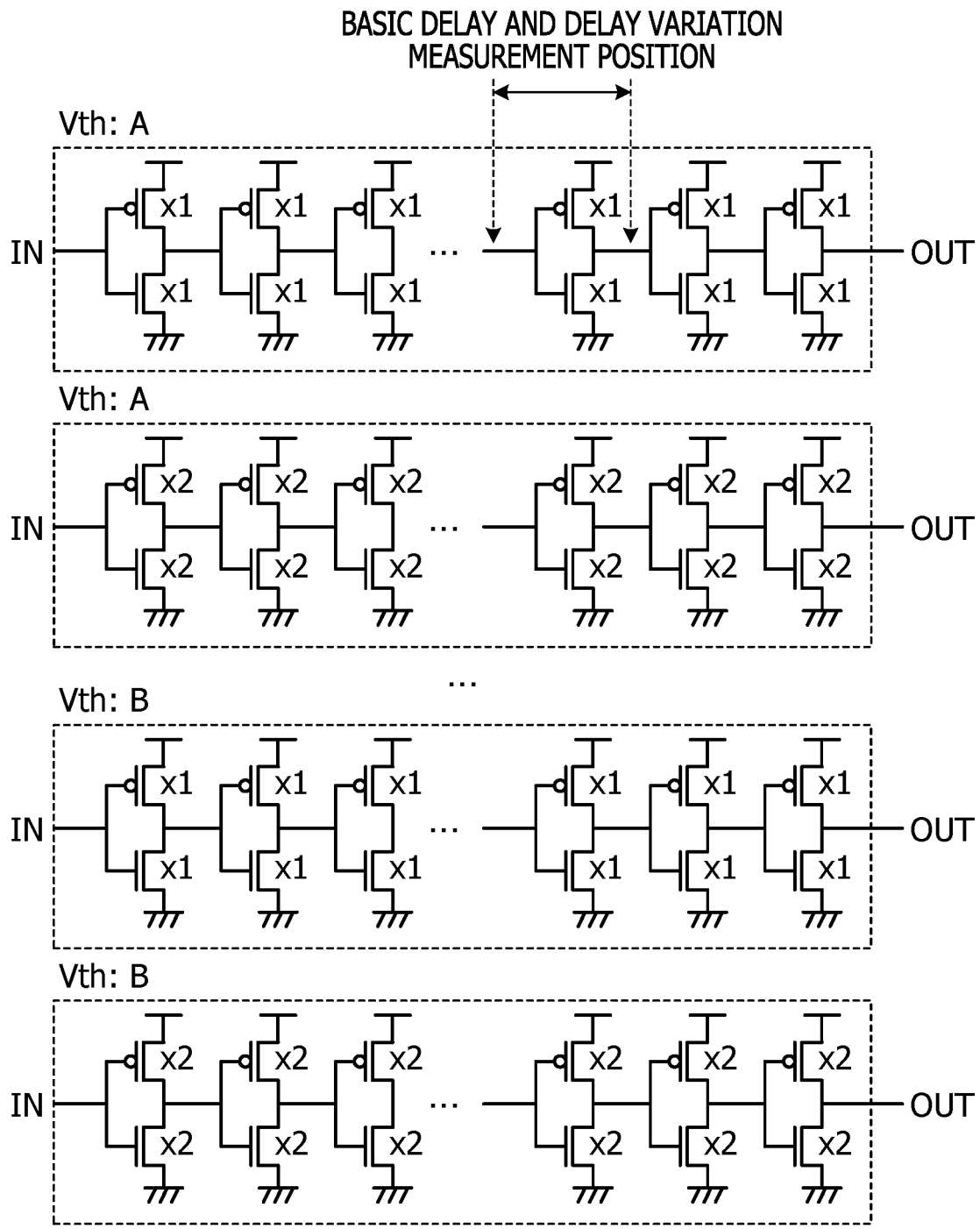
FIG. 3 illustrates an example of an evaluation model.

In step S100, the evaluation model creation unit 12a creates an evaluation model in which a plurality of transistors having the same threshold voltage (Vth) and the same drive force are coupled in series. As the evaluation model, the evaluation model creation unit 12a creates, for example, a vertically stacked single-stage inverter chain as illustrated in FIG. 3. FIG. 3 illustrates an example of the evaluation model. Examples of the evaluation model other than the vertically stacked single-stage inverter chain include a vertically stacked two-stage inverter chain, a NAND chain, and the like.

Figure 4:
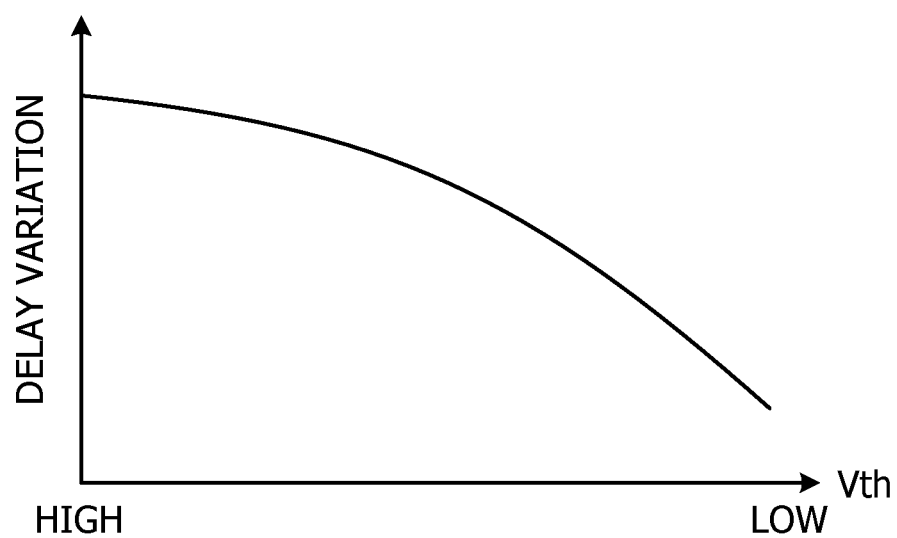
FIG. 4 illustrates an example of a graph of a result of a dependence evaluation of a delay variation with respect to a Vth.
Figure 5:
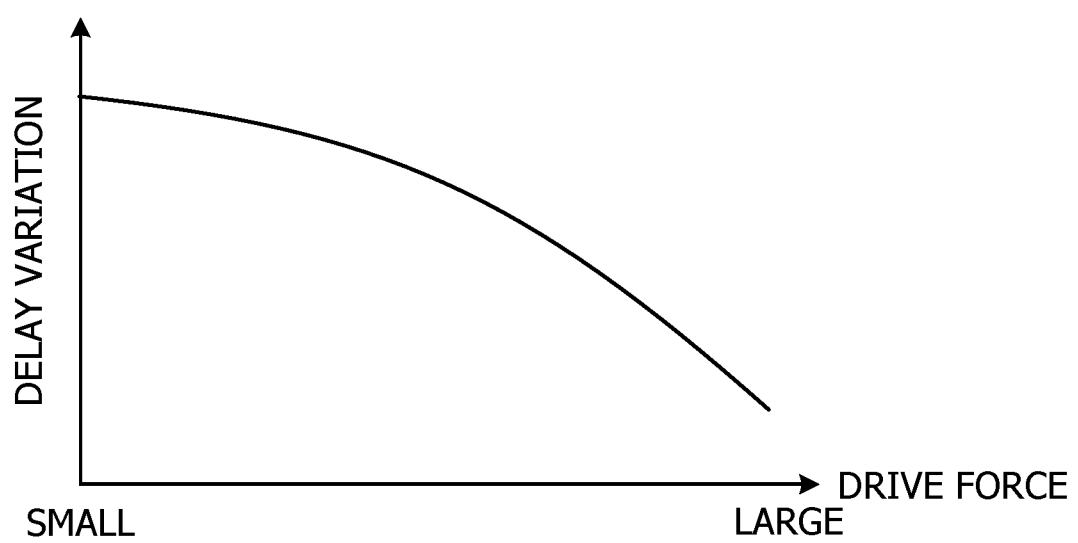
FIG. 5 illustrates an example of a graph of a result of the dependence evaluation of the delay variation with respect to a drive force.

In step S105, based on the evaluation model, the delay measurement unit 12b measures, by using a SPICE simulation or the like, a basic delay and a delay variation for a single gate stage for every combination of the Vth and the drive force included in a large-scale intellectual property (IP) having a plurality of signal paths. Thus, the delay measurement unit 12b performs an evaluation of dependence on the Vth and the drive force for the delay variation for a single gate stage. In the case where the evaluation model is the vertically stacked single-stage inverter chain illustrated in FIG. 3, a result of the dependence evaluation is obtained in which the delay variation increases as the Vth increases as illustrated in FIG. 4, and the delay variation increases as the drive force decreases as illustrated in FIG. 5. FIG. 4 illustrates an example of a graph of a result of the dependence evaluation of the delay variation on the Vth. FIG. 5 illustrates an example of a graph of a result of the dependence evaluation of the delay variation on the drive force.

In step S110, the delay variation DB creation unit 12c creates the delay variation DB 13d that stores the results of the dependence evaluation performed in step S105. As illustrated in FIG. 6, in the delay variation DB 13d, the Vth, the drive force, the basic delay for a single gate stage, a delay variation value for a single gate stage, and a delay variation coefficient for a single gate stage are associated with each other and stored. FIG. 6 illustrates an example of the delay variation DB. Furthermore, the delay variation DB creation unit 12c calculates the delay variation coefficient for a single gate stage in accordance with Expression (1). In Expression (1), Gate Delay$_{nominal}$ indicates the basic delay for a single gate stage, and Random (Vth, Drive Force) indicates the delay variation value for a single gate stage. A variable in the delay variation DB 13d is not limited to the Vth or the drive force, and for example, an input slew of the gate may be added as the variable.

$$\text{Delay Variation Coefficient} = \frac{\text{Random }(Vth, \text{Drive Force})}{\text{Gate }Delay_{nominal}} \quad (1)$$

In step S115, the basic timing library creation unit 12d measures, by using the SPICE simulation or the like, basic timing information of the large-scale IP in accordance with the template card and creates the basic timing library 13e storing a result of the measurement. The template card includes information such as temperature setting, voltage setting, and characteristic extraction points. The characteristic extraction points are an input slew and an output load and are ordinary data in library creation. The basic timing information does not include a delay variation value. The basic timing library 13e storing the basic timing information is an ordinary timing library that does not reflect the delay variation value.

Meanwhile, in step S120, the netlist analysis unit 12e analyzes the SPICE netlist 13a of the large-scale IP in accordance with the path list 13c. A gate stage number counting target for each of a plurality of paths included in the large-scale IP is described in the path list 13c. The gate stage number counting target includes an input terminal name and an output terminal name of a signal path desired to be obtained and transition information (rise edge, fall edge) of the input terminal name and the output terminal name. The netlist analysis unit 12e reads the gate stage number counting target for a single path from the path list 13c and searches for a signal path matching to the gate stage number counting target in the SPICE netlist 13a. When the signal path matching to the gate stage number counting target is found, the netlist analysis unit 12e obtains the Vth, the drive force, and the number of gate stages (minimum, maximum) of this signal path. The netlist analysis unit 12e repeats the search for the signal path matching to the gate stage number counting target until the path list 13c ends.

In step S125, as illustrated in FIG. 7, the path-specific information list creation unit 12f creates the path-specific information list 13f in which the following items are stored and associated with each other as the specific information of the path: an input pin name, an output pin name, and a side pin condition (control pin condition) of the signal path which have been found in step S120; and the Vth, the drive force, and the number of gate stages (minimum, maximum) which have been obtained in step S120. In the path-specific information list 13f, the Vth, the drive force, and the number of gate stages indicate the characteristics of each of the signal paths in the large-scale IP. FIG. 7 illustrates an example of the path-specific information list. The input pin name, the output pin name, and the side pin condition (control pin condition) of the signal path correspond to input and output information of each of the signal paths. A variable in the path-specific information list 13f is not limited to the Vth or the drive force, and for example, the input slew of the gate may be added as the variable.

In step S130, the extended delay variation coefficient calculation unit 12g reads from the path-specific information list 13f the path-specific information of the signal paths sequentially from the first signal path on a single-path-by-single-path basis and obtains the Vth and the drive force from the read path-specific information.

In step S135, the extended delay variation coefficient calculation unit 12g extracts and reads from the delay variation DB 13d a basic delay, for a single gate stage, a delay variation value, for a single gate stage, and a delay variation coefficient, for a single gate stage, that match to the Vth and the drive force obtained in step S130. The extended delay variation coefficient calculation unit 12g may extract only the delay variation coefficient when all the Vths included in the signal path are the same and all the drive forces included in the signal path are the same. In contrast, the extended delay variation coefficient calculation unit 12g may extract the basic delay and the delay variation value when even one of the Vths or even one of the drive forces included in the signal path vary. This may enable efficient reading from the delay variation DB 13d.

In step S140, the extended delay variation coefficient calculation unit 12g obtains the number of gate stages from the path-specific information of the signal path for a single path having been read in step S130 and calculates the extended delay variation coefficient based on the number of gate stages, the basic delay, and the delay variation value, or based on the number of gate stages and the delay variation coefficient.

To calculate the extended delay variation coefficient, it is preferable to take the characteristics of manufacturing variation of transistors into consideration. As described above, the intra-chip variation includes two types of manufacturing variation components, a systematic component and a random component. In a chip, the systematic component behaves like a constant whereas the random component is generated randomly.

The random component caused by the manufacturing variation of transistors follows a normal distribution, and random components of the individual transistors are independent of each other and have no correlation. There is a characteristic in which a sum of variances independent of each other is a variance of the sum of these. Accordingly, the variance of delay variation values due to the random component of the signal path in which n stages of the gates are coupled in series may be expressed as the sum of the variances of delay variation values for single gate stages included in the signal path. In order to calculate the variance of the delay variation values for single gate stages, it is sufficient that the standard deviation of the delay variation values for single gate stages exist.

Thus, the extended delay variation coefficient calculation unit 12g calculates the extended delay variation coefficient in accordance with the following procedure (A) to (E).

(A) Since the random component follows the normal distribution, the standard deviation may be easily evaluated. Accordingly, a small-scale circuit is configured to evaluate the standard deviation of the delay variation values for single gate stages by using the SPICE.

(B) The variance of the delay variation values for single gate stages is calculated by squaring the standard deviation of the delay variation values evaluated in (A) above.

(C) By calculating the sum of the variances of the delay variation values for single gate stages included in a signal path, the variance of the delay variation values of a signal path in which n stages of the gates are coupled in series is calculated.

(D) Since the unit systems do not match to each other when the variances remain unchanged, the standard deviation of the delay variation values of the signal path in which n stages of the gates are coupled in series is calculated by calculating the square root of the sum of the variances of the delay variation values of the signal path in which n stages of the gates n stages are coupled in series.

(E) The extended delay variation coefficient is calculated by generalizing the standard deviation calculated in (D) above.

For example, the extended delay variation coefficient calculation unit $12g$ holds the standard deviation of the delay variation values for single gate stages in accordance with the Vth and the drive force so as to allow calculation of the standard deviation of the delay variation values of the signal path in which n stages of the gates are coupled in series.

In more detail, a delay value Delay in which the intra-chip variation in the signal path in which n stages of the gates are coupled in series is reflected is given by Expression (2). Here, n is an integer greater than or equal to 1. In expression (2), Systematic represents the systematic component, and the unit of Systematic is % or a dimensionless quantity.

$$\text{Delay } [s] = \sum_{1}^{n} \text{Gate } Delay_{nominal} \times \text{Systematic } + \sqrt{\text{Random } (Vth, \text{Drive Force})_1^2 + \text{Random } (Vth, \text{Drive Force})_2^2 + \ldots + \text{Random } (Vth, \text{Drive Force})_n^2} \quad (2)$$

Since the second term on the right side of Expression (2) corresponds to the standard deviation of the delay variation value of the signal path in which n stages of the gates are coupled in series, the extended delay variation coefficient is given by Expression (3).

$$\text{Extended Delay Variation Coefficient} = \frac{\sqrt{\text{Random } (Vth, \text{Drive Force})_1^2 + \text{Random } (Vth, \text{Drive Force})_2^2 + \ldots + \text{Random } (Vth, \text{Drive Force})_n^2}}{\sum_{1}^{n} \text{Gate } Delay_{nominal}} \quad (3)$$

For example, when all the Vths included in the signal path are the same and all the drive forces included in the signal path are the same, Expression (3) given above may be approximated to Expression (4).

$$\text{Extended Delay Variation Coefficient} = \frac{\sqrt{n \times \text{Random } (Vth, \text{Drive Force})_1^2}}{n \times \text{Gate } Delay_{nominal}} = \frac{1}{\sqrt{n}} \times \frac{\text{Random } (Vth, \text{Drive Force})_1}{\text{Gate } Delay_{nominal}} \quad (4)$$

As described above, when all the Vths included in the signal path are the same and all the drive forces included in the signal path are the same, the extended delay variation coefficient may be easily calculated by multiplying the delay variation coefficient by $(1/\sqrt{\text{number n of gate stages}})$.

Accordingly, the extended delay variation coefficient calculation unit $12g$ calculates, in accordance with Expression (3) or Expression (4), the extended delay variation coefficient based on the basic delay, the delay variation value, and the delay variation coefficient having been read from the delay variation DB $13d$ in step S135. In this way, the extended delay variation coefficient calculation unit $12g$ calculates the extended delay variation coefficient based on the Vth, the drive force, and the number of gate stages of a certain signal path. Thus, the extended delay variation coefficient is a coefficient having values varying from one signal path to another. Also, the extended delay variation coefficient calculation unit $12g$ obtains the input pin name, the output pin name, and the side pin condition from the path-specific information having been read in step S130 and, as illustrated in FIG. 8, creates the extended delay variation coefficient DB $13g$ in which the input pin name, output pin name, and side pin condition having been obtained and the extended delay variation coefficient having been calculated are associated with each other and stored. FIG. 8 illustrates an example of the extended delay variation coefficient DB.

In step S145, the control unit 11 determines whether the processes in steps S130, S135, and S140 have been performed on all the paths included in the large-scale IP. When there is a path on which the processes in step S130, S135, or S140 has not been performed (step S145: No), the processing returns to step S130. In contrast, when there is not a path on which the process in step S130, S135, or S140 has not been performed (step S145: Yes), the processing proceeds to step S150.

In step S150, the extended timing library creation unit $12h$ creates, based on the basic timing library $13e$ and the extended delay variation coefficient DB $13g$, the extended timing library $13h$ as follows.

For example, first, the extended timing library creation unit $12h$ reads the input pin name, the output pin name, the side pin condition, and the extended delay variation coefficient that correspond to each other sequentially from the first row of the extended delay variation coefficient DB $13g$. Next, the extended timing library creation unit $12h$ searches for, in the basic timing library $13e$, basic timing information matching to the input pin name, the output pin name, and the side pin condition having been read from the extended delay variation coefficient DB $13g$. The extended timing library creation unit $12h$ creates extended timing information by multiplying the basic timing information found by searching in the basic timing library $13e$ by the extended delay variation coefficient having been read from the extended delay variation coefficient DB $13g$, and the extended timing library creation unit $12h$ writes the created extended timing information to the extended timing library $13h$. The extended timing library creation unit $12h$ creates the extended timing library $13h$ by repeatedly performing the above-described processes sequentially from the first row to the last row of the extended delay variation coefficient DB $13g$. The extended timing library $13h$ having been created in this manner is a timing library that reflects the extended delay variation coefficient varying from one path after another in accordance with the characteristics (for example, the Vth, the drive force, and the number of gate stages) of the individual signal paths in the large-scale IP. FIG. 9 illustrates an example of the extended timing library for the basic timing library. In FIG. 9, as examples, the case where the extended delay variation coefficient is 1.25 and the case where the extended delay variation coefficient is 1.50 are illustrated.

In step S155, instead of using a uniform timing margin, the timing analysis unit 12*i* performs the static timing analysis (STA) of the LSI by using the extended timing library 13*h* that is an optimal timing library for an IP having a plurality of signal paths such as a large-scale IP. Since the extended delay variation coefficient corresponding to the characteristics of each of the signal paths, for example, the Vth, the drive force, and the number of gate stages have already been applied to the timing information of the extended timing library 13*h*, it is not desired that, for performing the STA, an input file or the like for variation setting be separately provided. In the case where a timing violation exists in a result of the STA, the timing analysis unit 12*i* corrects the logic design or the physical arrangement, performs the STA again, and repeatedly performs the STA until there is no timing violation. As described above, since the timing analysis unit 12*i* performs the STA by using the extended timing library 13*h* instead of using a uniform timing margin, a timing margin corresponding to the characteristics of each of the signal paths may be incorporated in the signal path in a large-scale IP. Accordingly, timing verification for which an excessive margin is excluded may be performed.

<Relationship Between Number of Gate Stages and Delay Increment Due to Margin>

Figure 10:
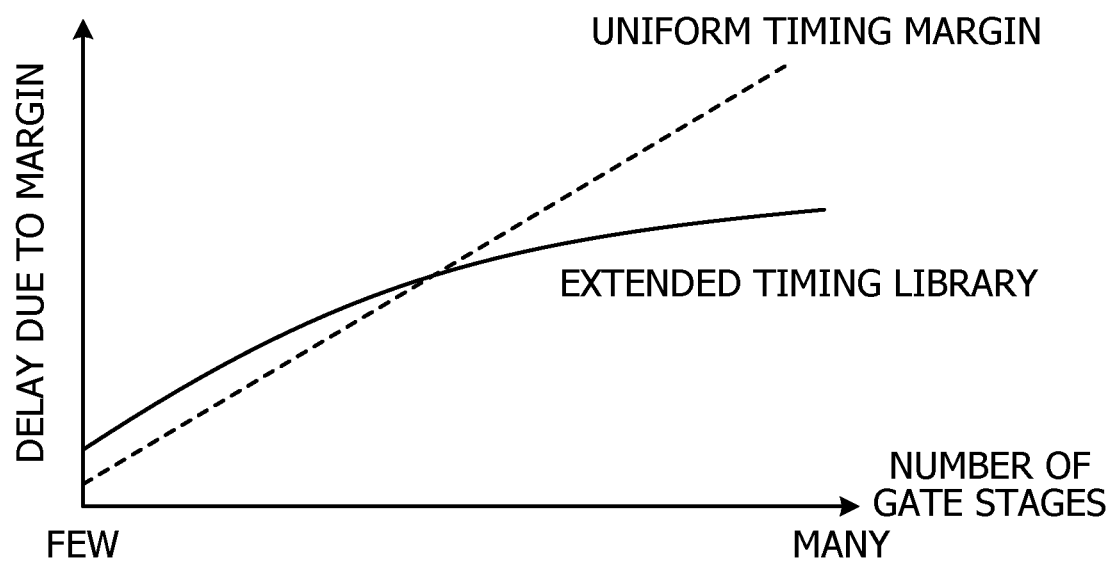
FIG. 10 is a graph illustrating an example of the relationship between the number of gate stages coupled in series and a delay due to a margin.

FIG. 10 is a graph illustrating an example of the relationship between the number of gate stages coupled in series and a delay due to a margin.

Since the uniform timing margin applied to the large-scale IP is likely to be an excessive value as described above, in the case where the uniform timing margin is applied to the large-scale IP, a delay due to the margin increases in proportion to an increase in the number of gate stages.

In contrast, as in the present disclosure, in the case where the extended timing library is applied to the large-scale IP instead of the uniform timing margin, when the number of gate stages is small, the delay due to the margin is larger than that in the case where the uniform timing margin is applied. However, as the number of gate stages increases, the increase in delay due to the margin decreases. When the number of gate stages exceeds a certain point, the delay due to the margin becomes smaller than that of the case where the uniform timing margin is applied. In the large-scale IP, the signal path that rate-controls the chip performance has a large number of gate stages. Thus, the timing margin in the design may be decreased by applying to the large-scale IP the extended timing library of the present disclosure.

<Computer that Executes Timing Library Creation Program>

Figure 11:
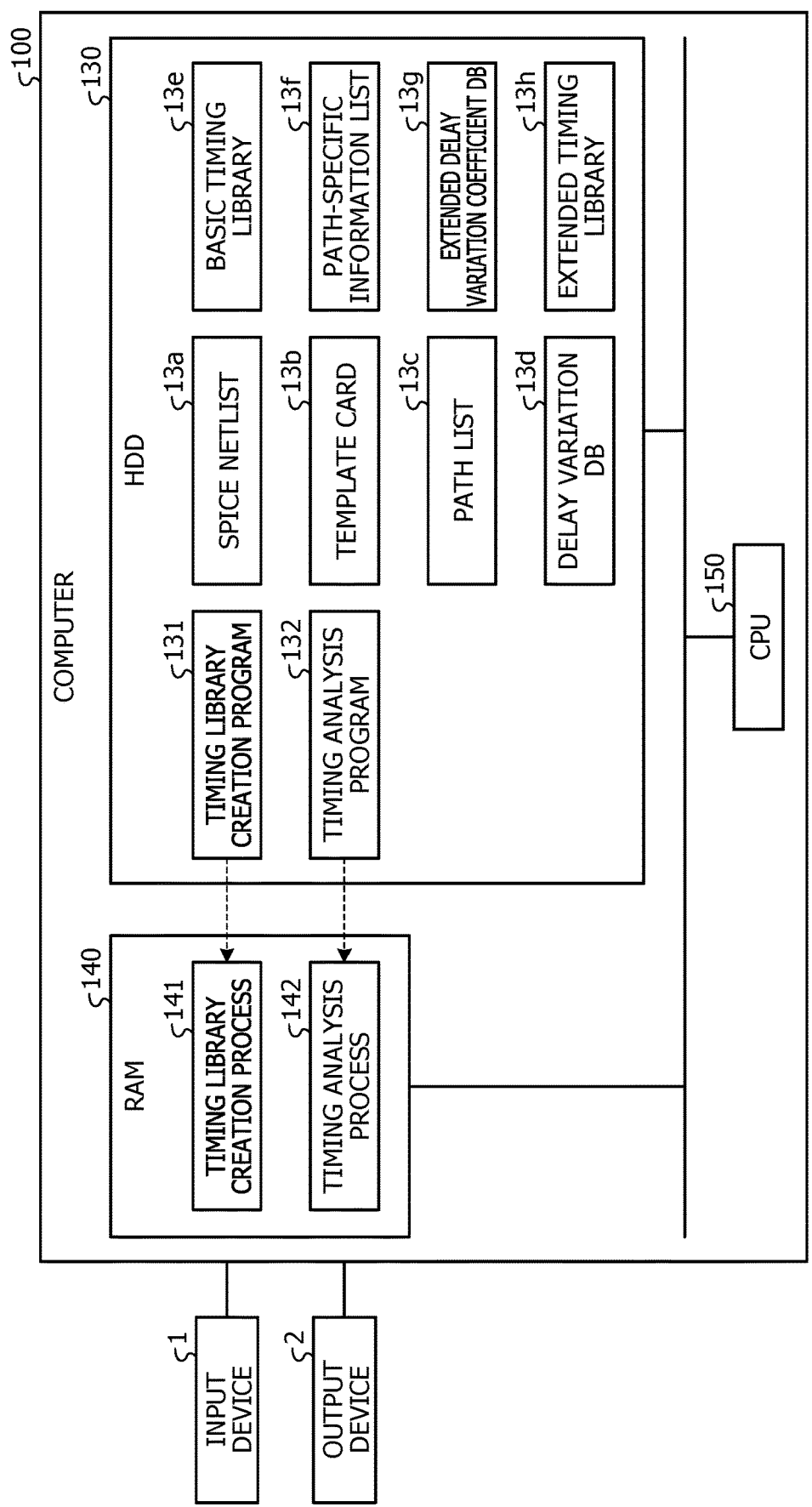
FIG. 11 illustrates an example of a hardware configuration of a computer that executes a timing library creation program and a timing analysis program.

The various processes performed by the processing unit 12 of the timing analysis apparatus 10 may be realized by executing programs prepared in advance on a computer such as a personal computer or a workstation. FIG. 11 illustrates an example of a hardware configuration of a computer that executes a timing library creation program and a timing analysis program.

As illustrated in FIG. 11, a computer 100 serving as the timing analysis apparatus 10 is coupled to the input device 1 and the output device 2 and includes an HDD 130, a RAM 140 and a CPU 150.

The HDD 130 stores the SPICE netlist 13*a*, the template card 13*b*, the path list 13*c*, the delay variation DB 13*d*, the basic timing library 13*e*, the path-specific information list 13*f*, the extended delay variation coefficient DB 13*g*, and the extended timing library 13*h*. The HDD 130 stores in advance a timing library creation program 131 and a timing analysis program 132. The timing library creation program 131 produces the functions similar to the functions of the evaluation model creation unit 12*a*, the delay measurement unit 12*b*, the delay variation DB creation unit 12*c*, the basic timing library creation unit 12*d*, the netlist analysis unit 12*e*, the path-specific information list creation unit 12*f*, the extended delay variation coefficient calculation unit 12*g*, and the extended timing library creation unit 12*h*. The timing analysis program 132 produces the function similar to the function of the timing analysis unit 12*i*.

As illustrated in FIG. 11, the CPU 150 reads the timing library creation program 131 from the HDD 130, and loads, in the RAM 140, the read timing library creation program 131 as a timing library creation process 141. Also, the CPU 150 reads the timing analysis program 132 from the HDD 130, and loads, in the RAM 140, the read timing analysis program 132 as a timing analysis process 142. The timing library creation process 141 executes processes similar to the processes in the evaluation model creation unit 12*a*, the delay measurement unit 12*b*, the delay variation DB creation unit 12*c*, the basic timing library creation unit 12*d*, the netlist analysis unit 12*e*, the path-specific information list creation unit 12*f*, the extended delay variation coefficient calculation unit 12*g*, and the extended timing library creation unit 12*h*. The timing analysis program 132 executes a process similar to the process in the timing analysis unit 12*i*.

The timing library creation program 131 or the timing analysis program 132 is not necessarily stored in the HDD 130 from the beginning. For example, the timing library creation program 131 and the timing analysis program 132 may be stored in a portable storage medium such as a magnetic disk, an optical disk, or an integrated circuit (IC) card readable by the computer 100. The CPU 150 may read the timing library creation program 131 and the timing analysis program 132 from the portable storage medium and loads, in the RAM 140, the timing library creation process 141 and the timing analysis process 142. The timing library creation program 131 and the timing analysis program 132 may be stored in a server to be coupled to the computer 100 via a network. In this case, the CPU 150 may obtain the timing library creation program 131 and the timing analysis program 132 from the server to execute these programs.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a timing library creation program of causing a computer to execute processing, the processing comprising:

extracting, from a delay variation database that stores delay variation values of gates included in circuit design data, a delay variation value, out of the delay valuation values matching to characteristics which are characteristics of one of signal paths in the circuit design data and which include a threshold voltage, a drive force, and a number of gate stages of the signal path;

calculating an extended delay variation coefficient based on the extracted delay variation value and the characteristics; and creating, based on a basic timing library in which the delay variation value is not reflected and the extended delay variation coefficient, an extended timing library in which the delay variation value is reflected, in the extracting, a delay variation value, for a single gate stage, that matches the threshold voltage and the drive force is extracted from the delay variation database, and in the calculating, the extended delay variation coefficient is calculated based on the extracted delay variation value for a single gate stage and the number of gate stages such that the extended delay variation coefficient varies from signal path to signal path.

2. A computer-implemented method of generating a timing library, the method comprising:

extracting, from a delay variation database that stores delay variation values of gates included in circuit design data, a delay variation value, out of the delay valuation values matching to characteristics which are characteristics of one of signal paths in the circuit design data and which include a threshold voltage, a drive force, and a number of gate stages of the signal path;

calculating an extended delay variation coefficient based on the extracted delay variation value and the characteristics; and creating, based on a basic timing library in which the delay variation value is not reflected and the extended delay variation coefficient, an extended timing library in which the delay variation value is reflected, in the extracting, a delay variation value, for a single gate stage, that matches the threshold voltage and the drive force is extracted from the delay variation database, and in the calculating, the extended delay variation coefficient is calculated based on the extracted delay variation value for a single gate stage and the number of gate stages such that the extended delay variation coefficient varies from signal path to signal path.

3. An apparatus comprising:

a memory; and a processor coupled to the memory, the processor being configured to perform processing, the processing including:

extracting, from a delay variation database that stores delay variation values of gates included in circuit design data, a delay variation value, out of the delay valuation values matching to characteristics which are characteristics of one of signal paths in the circuit design data and which include a threshold voltage, a drive force, and a number of gate stages of the signal path;

calculating an extended delay variation coefficient based on the extracted delay variation value and the characteristics;

creating, based on a basic timing library in which the delay variation value is not reflected and the extended delay variation coefficient, an extended timing library in which the delay variation value is reflected; and perform, by using the extended timing library, a static timing analysis on a circuit defined by the circuit design data, in the extracting, a delay variation value, for a single gate stage, that matches the threshold voltage and the drive force is extracted from the delay variation database, and in the calculating, the extended delay variation coefficient is calculated based on the extracted delay variation value for a single gate stage and the number of gate stages such that the extended delay variation coefficient varies from signal path to signal path.

\* \* \* \* \*